(12) United States Patent
Frederick et al.

(10) Patent No.: US 11,478,680 B1
(45) Date of Patent: Oct. 25, 2022

(54) SYSTEM AND METHOD FOR MEASURING VERTICAL JUMP

(71) Applicant: DASHR, LLC, Lincoln, NE (US)

(72) Inventors: Thomas Frederick, Lincoln, NE (US); Chase Pfeifer, Lincoln, NE (US)

(73) Assignee: Dashr, LLC, Lincoln, NE (US)

( * ) Notice: Subject to any disclaimer, the term of this patent is extended or adjusted under 35 U.S.C. 154(b) by 110 days.

(21) Appl. No.: 16/743,184

(22) Filed: Jan. 15, 2020

Related U.S. Application Data

(60) Provisional application No. 62/792,687, filed on Jan. 15, 2019.

(51) Int. Cl.
*A63B 24/00* (2006.01)
*G01S 17/08* (2006.01)
(Continued)

(52) U.S. Cl.
CPC ............ *A63B 24/0062* (2013.01); *A63B 5/16* (2013.01); *A63B 71/0619* (2013.01); *G01S 15/08* (2013.01); *G01S 17/08* (2013.01); *A63B 2220/13* (2013.01); *A63B 2220/20* (2013.01); *A63B 2220/802* (2013.01); *A63B 2220/805* (2013.01); *A63B 2220/807* (2013.01)

(58) Field of Classification Search
CPC ... A63B 24/0062; A63B 5/16; A63B 71/0619; A63B 2220/13; A63B 2220/20; A63B 2220/802; A63B 2220/805; A63B 2220/807; G01S 15/08; G01S 17/08
See application file for complete search history.

(56) References Cited

U.S. PATENT DOCUMENTS 4,208,050 A * 6/1980 Perrine ..................... A63B 5/16 482/148
4,932,137 A * 6/1990 Haley ....................... A63B 5/16 482/901
(Continued)

FOREIGN PATENT DOCUMENTS

EP 2098268 A1 9/2009
WO 2017149526 A2 9/2017

OTHER PUBLICATIONS

LSR Tech, LLC, LSR2 Dual Laser Measuring Device; Feb. 15, 2018, https://www.amazon.com/LSR2-Dual-Laser-Measuring-Device/dp/B079V97Q6X/ref=asc_df_B079V97Q6X/?tag=hyprod-20&linkCode=df0&hvadid=309823018507&hvpos=1o1&hvnetw=g&hvrand=7273446398852330453&hvpone=&hvptwo=&hvqmt=&hvdev=c&hvdvcmdl=&hvlocint=&hvlocphy=9024587&hvtargid=aud-466360936450:ola-571379668943&psc=1&tag=&ref=&adgrpid=60862048799&hvpone=&hvptwo=&hvadid=309823018507&hvpos=1o1&hvnetw=g&hvrand=7273446398852330453&hvqmt=&hvdev=c&hvdvcmdl=&hvlocint=&hvlocphy=9024587&hvtargid=aud-466360936450:pla-571379668943.
(Continued)

*Primary Examiner* — Jeffrey S Vanderveen
(74) *Attorney, Agent, or Firm* — Suiter Swantz pc llo

(57) ABSTRACT

A system for measuring vertical jump is disclosed, in accordance with one or more embodiments of the present disclosure. The system may include a vane assembly comprising a plurality of vanes movably coupled to an extendable member at a plurality of heights relative to a ground level, each being vane displaceable from an original position to a displaced position in response to contact from a user. The system may also include a measurement device configured to obtain at least one of: a baseline height from a first vane of the plurality of vanes to the ground level; a user height; a user reach; or a displacement height, wherein the
(Continued)

displacement height is the height of the uppermost vane in a displaced position relative to the ground level. The system may also include a controller communicatively coupled to the measurement device.

19 Claims, 7 Drawing Sheets

(51) Int. Cl.
    *G01S 15/08*     (2006.01)
    *A63B 5/16*     (2006.01)
    *A63B 71/06*     (2006.01)

(56) References Cited

U.S. PATENT DOCUMENTS

| | | | |
|---|---|---|---|
| 9,682,280 B1 * | 6/2017 | Wagner | A61B 5/6892 |
| 2008/0248871 A1 * | 10/2008 | Szturm | G06F 3/0346 |
| | | | 600/587 |
| 2016/0193518 A1 * | 7/2016 | Baxter | A63B 71/0669 |
| | | | 473/483 |

OTHER PUBLICATIONS

Magpie Tech, VH-80 Laser Distance Measurer with Multiple Measurement Units, Jan. 22, 2018, https://www.amazon.com/Worlds-First-Bilateral-Magpie-Tech/dp/B07975RT7L.

Gill Athletics, "Electronic Vertical Jump Tester", https://www.gillporter.com/gill_store/catalog/product/view/id/12673/, Product Code: TA199C12 (Accessed Jul. 15, 2020).

\* cited by examiner

SYSTEM AND METHOD FOR MEASURING VERTICAL JUMP

CROSS-REFERENCE TO RELATED APPLICATION

The present application claims the benefit under 35 U.S.C. § 119(e) of U.S. Provisional Application Ser. No. 62/792,687, filed Jan. 15, 2019, entitled SYSTEM AND METHOD FOR MEASURING VERTICAL JUMP, naming Thomas Frederick and Chase Pfeifer as inventors, which is incorporated herein by reference in the entirety.

TECHNICAL FIELD

The present invention generally relates to athlete training devices, and, more particularly, to an athlete vertical jump measurement system.

BACKGROUND

Vertical jump is an important metric for athletes in many sports, including basketball, volleyball, and football, and is commonly tested during athletic training. In order to measure the vertical jump of an athlete, current mechanical vertical jump apparatuses must be adjusted for each individual athlete. For example, a vertical jump apparatus may be adjusted according to an athlete's standing reach, such that the vertical jump apparatus must be adjusted for athletes with varying standing reaches. This requires frequent, tedious adjustments when measuring vertical jump values for a large number of athletes, such as a football or track team with 125+ athletes. Furthermore, traditional vertical jump apparatuses may be susceptible to manipulation by athletes, such as slouching during a standing reach in order to achieve effectively larger vertical jump values. Therefore, it would be desirable to provide a system and method that cure one or more of the shortfalls of the previous approaches identified above.

SUMMARY

A system is disclosed, in accordance with one or more embodiments of the present disclosure. In one embodiment, the system includes a vane assembly comprising a plurality of vanes movably coupled to an extendable member at a plurality of heights relative to a ground level. Each vane being displaceable from an original position to a displaced position in response to contact from a user. In another embodiment, the system includes a measurement device configured to obtain at least one of: a baseline height from a first vane of the plurality of vanes to the ground level, a user height, a user reach, or a displacement height. The displacement height is the height of the uppermost vane in a displaced position relative to the ground level. In another embodiment, the system includes a controller communicatively coupled to the measurement device, the controller configured to: receive at least one of a user height, the user reach, the baseline height, or the displacement height from the measurement device; and calculate a vertical jump value of the user based at least on the displacement height.

A system is disclosed, in accordance with one or more embodiments of the present disclosure. In one embodiment, the system includes a measurement device communicatively couplable to a vane assembly. The vane assembly comprising a plurality of vanes movably coupled to an extendable member at a plurality of heights relative to a ground level. Each vane being displaceable from an original position to a displaced position in response to contact from a user. In another embodiment, the system includes a measurement device configured to obtain at least one of: a baseline height from a first vane of the plurality of vanes to the ground level, a user height, a user reach, or a displacement height. The displacement height is the height of the uppermost vane in a displaced position relative to the ground level. In another embodiment, the system includes a controller communicatively coupled to the measurement device, the controller configured to: receive at least one of a user height, the user reach, the baseline height, or the displacement height from the measurement device; and calculate a vertical jump value of the user based at least on the displacement height.

A method is disclosed, in accordance with one or more embodiments of the present disclosure. The method may include, but is not limited to, obtaining a user height with a measurement device. The method may further include, but is not limited to, obtaining a user reach with the measurement device. The method may include, but is not limited to, displacing one or more vanes of a plurality of vanes in response to contact from a user. The method may include, but is not limited to, obtaining a displacement height with the measurement device. The method may include, but is not limited to, calculating a vertical jump value of the user based at least one the user reach and the displacement height.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Referring generally to FIGS. 1-5, a vertical jump measurement system is described, in accordance with one or more embodiments of the present disclosure.

Embodiments of the present disclosure are directed to a vertical jump measurement system including a measurement device. Additional embodiments of the present disclosure are directed to a vertical jump measurement system which may measure the vertical jump of multiple athletes without having to adjust the system for each individual athlete. Additional embodiments of the present disclosure are directed to a controller communicatively coupled to a measurement device and configured to display a vertical jump value of an athlete on a user device.

Figure 1:
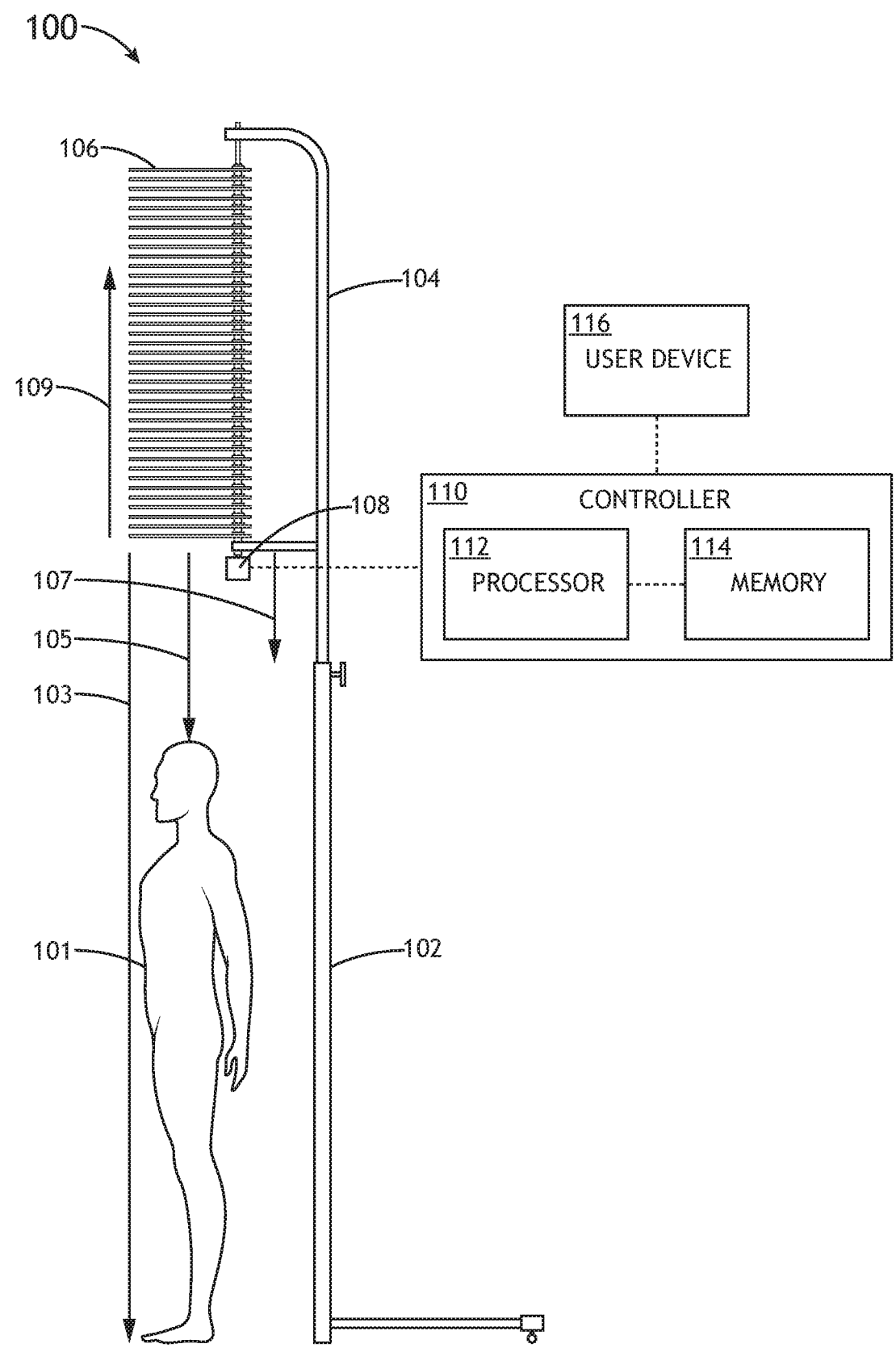
FIG. 1 illustrates a simplified diagram of a vertical jump measurement system, in accordance with one or more embodiments of the present disclosure.

FIG. 1 illustrates a simplified diagram of a vertical jump measurement system 100, in accordance with one or more embodiments of the present disclosure. System 100 may include, but is not limited to, a base structure 102, an extendable member 104, a vane assembly 106, a measurement device 108, a controller 110, and a user device 116.

The base structure 102 of system 100 may be disposed at a ground level. The base structure 102 may include one or more structures configured to support system 100 and/or maintain system 100 in an upright position. For example, as shown in FIG. 1, the base structure may include one or more "feet" or "legs." In another embodiment, the extendable member 104 is slidingly coupled to the base structure 102. For example, as shown in FIG. 1, the extendable member 104 may be configured to be disposed within the base structure 102 such that the extendable member may be translated and/or actuated up and down within the base structure 102. In embodiments, the extendable member 104 and/or the base structure 102 may include structures configured to maintain the extendable member 104 in a fixed position relative to the base structure 102 (e.g., at a fixed height). For example, the base structure 102 and/or the extendable member 104 may include one or more notches, detents, tabs, buttons, handles, knobs, or the like. For instance, as shown in FIG. 1, the base structure 102 may include a knob configured to engage the extendable member 104 in order to maintain the extendable member 104 at a fixed height. In another embodiment, the base structure 102 and/or the extendable member 104 may include an actuator (e.g., motor, and the like) configured to actuate the extendable member 104 relative to the base structure.

In another embodiment, the vane assembly 106 includes a plurality of vanes 106 movably coupled to the extendable member 104. The vanes 106 of the vane assembly 106 may be coupled to the extendable member 104 at a plurality of heights relative to a ground level. For example, the plurality of vanes 106 may include a first vane 106a coupled to the extendable member 104 at a first height, a second vane 106b coupled to the extendable member 104 at a second height different from the first height, and the like. As shown in FIG. 1, the plurality of vanes 106 may be rotatably coupled to the extendable member 104, such that the vanes 106 may rotate around the extendable member 104 in response to contact by a user 101. In this regard, the vanes 106 of the plurality of vanes 106 may be configured to be displaced from an original position (e.g., a "start" position) to a displaced position (e.g., an "end" position) in response to contact from a user. The plurality of vanes 106 may include a labeling scheme to facilitate efficient identification of the heights of the plurality of vanes 106. For example, the vanes 106 of the plurality of vanes 106 may be color-coded. By way of another example, the vanes 106 of the plurality of vanes 106 may be labeled numerically. By way of a further example, the vanes 106 of the plurality of vanes 106 may be labeled alphabetically. It is contemplated herein that the system 100 may utilize any labeling scheme suitable for facilitating efficient identification of the heights of the plurality of vanes 106, therefore the above description shall not limit the scope of the present disclosure.

In another embodiment, the measurement device 108 is coupled to the base structure 102 and/or the extendable member 104. For example, as shown in FIG. 1, the measurement device 108 may be coupled to the extendable member 104 proximate to a first vane 106a of the plurality of vanes 106. In embodiments, the measurement device 108 is configured to obtain at least one of a baseline height 103, a user height 105, a user reach 107, or a displacement height 109.

In one embodiment, the measurement device 108 is configured to obtain baseline height 103 of the system 100. The baseline height 103 may be defined as the height from a first vane 106a of the plurality of vanes 106 to a ground level, as shown in FIG. 1. In another embodiment, the measurement device 108 is configured to obtain a user height 105. The user height 105 may be defined as the distance from a ground level to the top of a user's 101 head. In another embodiment, the measurement device 108 is configured to obtain a user reach 107. The user reach 107 may be defined as a standing reach value of a user 101 from a ground level to the top of the standing reach of the user 101.

In another embodiment, the measurement device 108 is configured to obtain a displacement height 109 of a user 101. The displacement height 109 may be defined as the height of the uppermost vane 106 in a displaced position. For example, during a vertical jump measurement, a user 101 may jump and contact a subset of vanes 106 of the plurality of vanes 106, thereby displacing the subset of vanes 106 from an original position (e.g., a "start" position) to a displaced position (e.g., a "end" position). The displacement height 109 may be defined as the distance from the uppermost vane 106 in a displaced position to the ground level.

The measurement device 108 may include any measurement device known in the art for obtaining the various measurements of system 100. For example, the measurement device 108 may include, but are not limited to, one or more laser distance finders. By way of another example, the measurement device 108 may include one or more ultrasonic measurement devices, one or more cameras, one or more time of flight sensors, one or more beam break sensors, and the like. For instance, the measurement device 108 may include one or more laser distance finders which are configured to obtain any and/or all of the baseline height 103, the user height 105, the user reach 107, and the displacement height 109. By way of another example, the measurement device 108 may include one or more bi-directional laser distance finders.

It is noted herein that a device (e.g., a glove, a thimble, a finger clamp, and the like) may be disposed on a finger of the user 101 in order to facilitate measurement of the user reach 107. For example, in embodiments where the measurement device 108 includes one or more laser-based measurement devices, a thimble disposed on the middle finger of a user 101 may facilitate accurate measurement of the user reach 107. Similarly, it is contemplated herein that a flat object (e.g., clip board, and the like) may be placed upon the head of a user 101 in order to facilitate accurate calculation of the user height 105. It is further contemplated herein that a thickness of the clipboard or other flat object may be subtracted out to obtain an accurate user height 105 value. Similarly, it is noted herein that a clipboard or other flat object may be placed on the ground when obtaining the baseline height 103. It is contemplated herein that placing a flat object on the ground may facilitate accurate and effective measurement of the baseline height 103 when system 100 is being used on uneven surfaces, such as gravel, grass, and the like.

In another embodiment, the measurement device 108 may be communicatively coupled to the controller 110. The measurement device 108 may be communicatively coupled to the controller 110 in any wireless or wireline configuration known in the art including, but not limited to, DSL-based interconnection, cable-based interconnection, T9-based interconnection, GSM, GPRS, CDMA, EV-DO, EDGE, WiMAX, 3G, 4G, 4G LTE, 5G, WiFi protocols, Bluetooth protocols, RF, LoRa, and the like.

The controller 110 may include one or more processors 112 and a memory 114, wherein the one or more processors 112 are configured to execute a set of program instructions stored in memory 114, the program instructions configured to cause the one or more processors 112 to carry out various steps of the present disclosure. In another embodiment, the controller 110 is communicatively coupled to the user device 116. The user device 116 may be configured to display data collected and calculated by system 100.

In one embodiment, the controller 110 includes a local controller. For example, the controller 110 may include a desktop computer, laptop, tablet, smart phone, smart watch, and the like, which is communicatively coupled to the measurement device 108. In embodiments where the controller 110 comprises a local controller, it is contemplated herein that the measurement device 108 and the local controller 110 may be contained within the same and/or separate housings. In additional and/or alternative embodiments, the controller 110 may include a remote controller 110. For example, the controller 110 may include a server which is communicatively coupled to the measurement device 108 via a wireline or wireless connection. For instance, the controller 110 may include a cloud-based server communicatively coupled to the measurement device 108 via a network. In embodiments where the controller 110 comprises a remote server (e.g., networked server), the user device 116 may comprise a desktop computer, laptop, tablet, smart phone, smart watch, and the like, which is communicatively coupled to the remote server (e.g., controller 110). In this regard, various components of system 100 (e.g., measurement devices 108, controller 110, user device 116, and the like) may include a network interface configured to communicatively couple to a network.

In one embodiment, the one or more processors 112 are configured to receive at least one of the values obtained by the measurement device 108 (e.g., baseline height 103, user height 105, user reach 107, displacement height 109, and the like) and store the received values in memory. In another embodiment, the one or more processors 112 are configured to calculate a vertical jump value of a user 101. The one or more processors 112 may be configured to calculate the vertical jump value of the user 101 based on one or more values received from the measurement device 108. For example, a vertical jump value of a user 101 may be defined as the distance from an uppermost vane in a displaced position to a ground level (e.g., displacement height 109). By way of another example, a vertical jump value of a user 101 may be defined as the difference between a displacement height 109 and a user reach 107. It may be appreciated that a vertical jump value may be calculated from any frame of reference without departing from the scope of the present disclosure, unless noted otherwise herein.

It is noted herein that a vertical jump may be measured in several different ways. A "relative" vertical jump value may be defined as the difference between a user reach 107 of a user 101 and the height of an uppermost displaced vane 106. This may be referred to as a "relative" vertical jump height, as it takes into account an original user reach 107. Conversely, an "absolute" vertical jump value may be defined as the distance between ground level and an uppermost displaced vane 106. This may be referred to as an "absolute" vertical jump value as it does not take into account a user reach 107, and instead indicates a highest point relative to ground a user 101 may reach.

It is further noted herein that traditional vertical jump measurement systems may only be configured to measure a "relative" vertical jump value. However, in many sports, the "absolute" vertical jump value of a user 101 may be a more important metric. Accordingly, it is contemplated herein that the one or more processors 112 of system 100 may be configured to calculate both a "relative" vertical jump value and an "absolute" vertical jump value of a user 101. It is contemplated herein that the ability of system 100 to calculate both "relative" and "absolute" vertical jump values may allow for more useful and insightful athletic training metric collection.

In another embodiment, the one or more processors 112 are configured to display values collected and calculated by system 100 via the user device 116. In embodiments where the one or more processors 112 are configured to calculate both a "relative" and "absolute" vertical jump value, the one or more processors 112 may be configured to display both values via the user device 116.

In one embodiment, the user device 116 may include a user interface. In another embodiment, the user interface of the user device 116 may be embodied within, but is not limited to, one or more desktop computers, tablets, smartphones, smart watches, or the like. In another embodiment, the user device 116 may include a display. The display of the user device 116 may include any display known in the art. For example, the display may include, but is not limited to, a liquid crystal display (LCD), an organic light-emitting diode (OLED) based display, or a CRT display. Those skilled in the art should recognize that any display device capable of integration with the user device 116 is suitable for implementation in the present disclosure. For example, the one or more processors 112 may be configured to display a calculated vertical jump value of a user 101 via display.

In one embodiment, the user device 116 may be further configured to receive selections, instructions, and/or input commands responsive to data displayed via display. In this regard, the one or more processors 112 may be configured to receive one or more input commands from the user device 116. For example, the one or more processors 112 may be configured to cause the measurement device 108 to collect measurements (e.g., baseline height 103, user height 105, user reach 107, displacement height 109, and the like) in response to input commands received from the user device 116. By way of another example, the one or more processors 112 may be configured to cause an actuator to actuate the extendable member 104 relative to the base structure 102 (e.g., adjust the height of the extendable member 104) in response to input commands received from the user device 116. The one or more processors 112 may be further configured to transmit one or more signals to the measurement devices 108, wherein the one or more signals are configured to cause the measurement device 108 to collect various values of the present disclosure (e.g., baseline height 103, user height 105, user reach 107, displacement height 109, and the like).

In additional and/or alternative embodiments, various measurements obtained by the measurement device 108 may be input via the user device 116 and/or retrieved from memory 114. For example, the heights of a group of users 101 may be stored in a database saved in the memory 114. Upon entry of a name, PIN, or other identifying information, the system 100 may be configured to retrieve the height of a user 101 such that the measurement device 108 may not be required to obtain a user height 103 measurement. By way of another example, a user 101 may input their height via the user device 116 such that the measurement device 108 may not be required to obtain a user height 103 measurement. By way of another example, measurement values may be imported and/or obtained by means other than system 100 and input via user device 116. For instance, a user reach 107 may be measured via a tape measure and input into system 100 via user device 116 and/or controller 110 such that the measurement device 108 may not be required to obtain a user reach 107 measurement.

Figure 2:
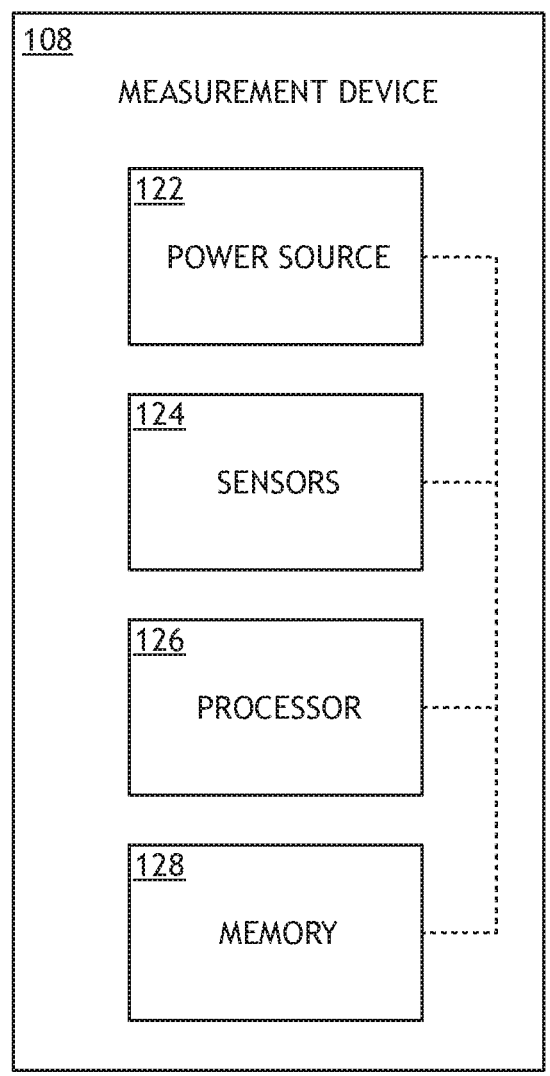
FIG. 2 illustrates a measurement device of the vertical jump measurement system, in accordance with one or more embodiments of the present disclosure.

FIG. 2 illustrates a measurement device 108 of the vertical jump measurement system 100, in accordance with one or more embodiments of the present disclosure. The measurement device 108 may include, but is not limited to, one or more power sources 122, one or more sensors 124, one or more processors 126, and a memory 128.

In embodiments, the measurement device 108 includes one or more sensors 124. As noted previously herein, the one or more sensors 124 of the measurement device 108 may include any sensors known in the art for measuring the various values of the present disclosure (e.g., baseline height 103, user height 105, user reach 107, displacement height 109, and the like). For example, the one or more sensors 124 may include, but are not limited to, one or more laser sensors, one or more ultrasonic sensors, one or more cameras, one or more beam break sensors, and the like. It is noted herein that, in embodiments where the one or more sensors 124 comprise one or more beam break sensors, the beam break sensors may be communicatively coupled to beam break sensors disposed on each vane 106.

In another embodiment, the one or more sensors 124 are communicatively coupled to one or more processors 126 and a memory 128. The one or more processors 126 may be configured to execute a set of program instructions stored in memory 128, the set of program instructions configured to cause the one or more processors 126 to carry out various steps of the present disclosure.

In embodiments, the one or more processors 126 of the measurement device 108 may be configured to cause the one or more sensors 124 to obtain the various measurement values of the present disclosure and store the measurement values in memory 128. For example, while measuring the vertical jump of a user 101, the user 101 may first stand proximate to the base structure 102 with their hands by their side. The one or more processors 126 may be configured to obtain the user height 105 and store the user height 105 in memory 128. The one or more processors 126 may also be configured to obtain a baseline height 103 and store the baseline height 103 in memory 128. The user 101 may then extend one arm vertically, and the one or more processors 126 may be configured to obtain a user reach 107 and store the user reach 107 in memory 128. The user 101 may then jump and contact a subset of vanes 106 of the plurality of vanes 106, thereby displacing the subset of vanes 106 from an original position to a displaced position. The one or more processors 126 may then be configured to obtain a displacement height 109 and store the displacement height 109 in memory 128.

As noted previously herein, the displacement height 109 may be defined as the distance between the highest vane 106 in a displaced position to a ground level. It is further noted herein that, in some embodiments, the measurement device 108 may be located substantially beneath, and may be configured to obtain measurements relative to vanes 106 in an original position. In this regard, in order to obtain a displacement height 109, the measurement device 108 may be configured to obtain a height between a ground position and the lowest vane 106 in an original position and subtract a pre-defined vane 106 spacing to obtain the displacement height 109, which is defined as the distance between the highest vane 106 in a displaced position and a ground level. The vane spacing may be stored in memory 128, 114.

It is noted herein that the one or more processors 126 may be configured to automatically cause the one or more sensors 124 to obtain the various values of the present disclosure (e.g., baseline height 103, user height 105, user reach 107, displacement height 109, and the like). In additional and/or alternative embodiments, the one or more processors 126 may be configured to cause the one or more sensors 124 to obtain the various values of the present disclosure in response to one or more signals received from the controller 110. For example, the one or more processors 112 may be configured to transmit one or more signals to the measurement device 108 in response to an input command received from the user device 116, wherein the one or more signals are configured to cause the measurement device to obtain the various values of the present disclosure.

It is noted herein that the one or more components of system 100 may be communicatively coupled to the various other components of system 100 in any manner known in the art. For example, the one or more processors 112, 126 may be communicatively coupled to each other and other components of system 100 (e.g., measurement devices 108, user device 116, and the like) via a wireline (e.g., copper wire, fiber optic cable, and the like) or wireless connection (e.g., RF coupling, IR coupling, 3G, 4G, 4G LTE, 5G, WiFi, WiMax, Bluetooth and the like.

In one embodiment, the one or more processors 112, 126 may include any one or more processing elements known in the art. In this sense, the one or more processors 112, 126 may include any microprocessor-type device configured to execute software algorithms and/or instructions. In one embodiment, the one or more processors 112, 126 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 112, 126. In general, the term "processor" may be broadly defined to encompass any device having one or more processing elements, which execute program instructions from memory 114, 128. Moreover, different subsystems of the system 100 (e.g., measurement devices 108, user device 116, display, and the like) may include processor or logic elements suitable for carrying out at least a portion of the steps described throughout the present disclosure. Therefore, the above description should not be interpreted as a limitation on the present disclosure but merely an illustration.

The memory 114, 128 may include any storage medium known in the art suitable for storing program instructions executable by the associated one or more processors 112, 126 and the data received from the measurement devices 108 (e.g., baseline height 103, user height 105, user reach 107, displacement height 109, and the like). For example, the memory 114, 128 may include a non-transitory memory medium. For instance, the memory 114, 128 may include, but is not limited to, a read-only memory (ROM), a random access memory (RAM), a magnetic or optical memory device (e.g., disk), a magnetic tape, a solid state drive and the like. It is further noted that memory 114, 128 may be housed in a common controller housing with the one or more processors 112, 126. In an alternative embodiment, the memory 114, 128 may be located remotely with respect to the physical location of the processors 112, 126, controller 110, and the like. In another embodiment, the memory 114, 128 maintains program instructions for causing the one or more processors 112, 126 to carry out the various steps described through the present disclosure.

Figure 3A:
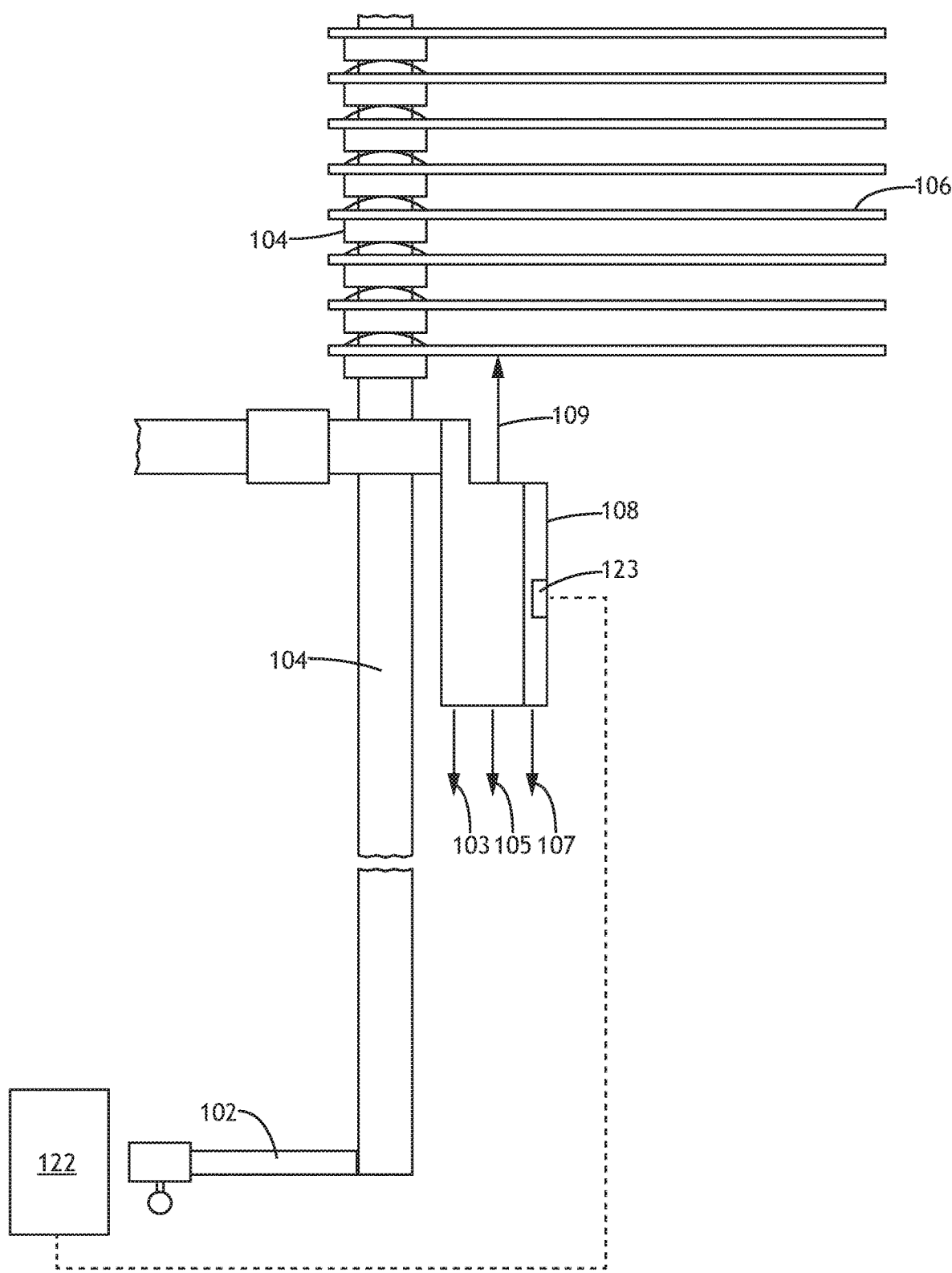
FIG. 3A illustrates a measurement device of the vertical jump measurement system, in accordance with one or more embodiments of the present disclosure.
Figure 3B:
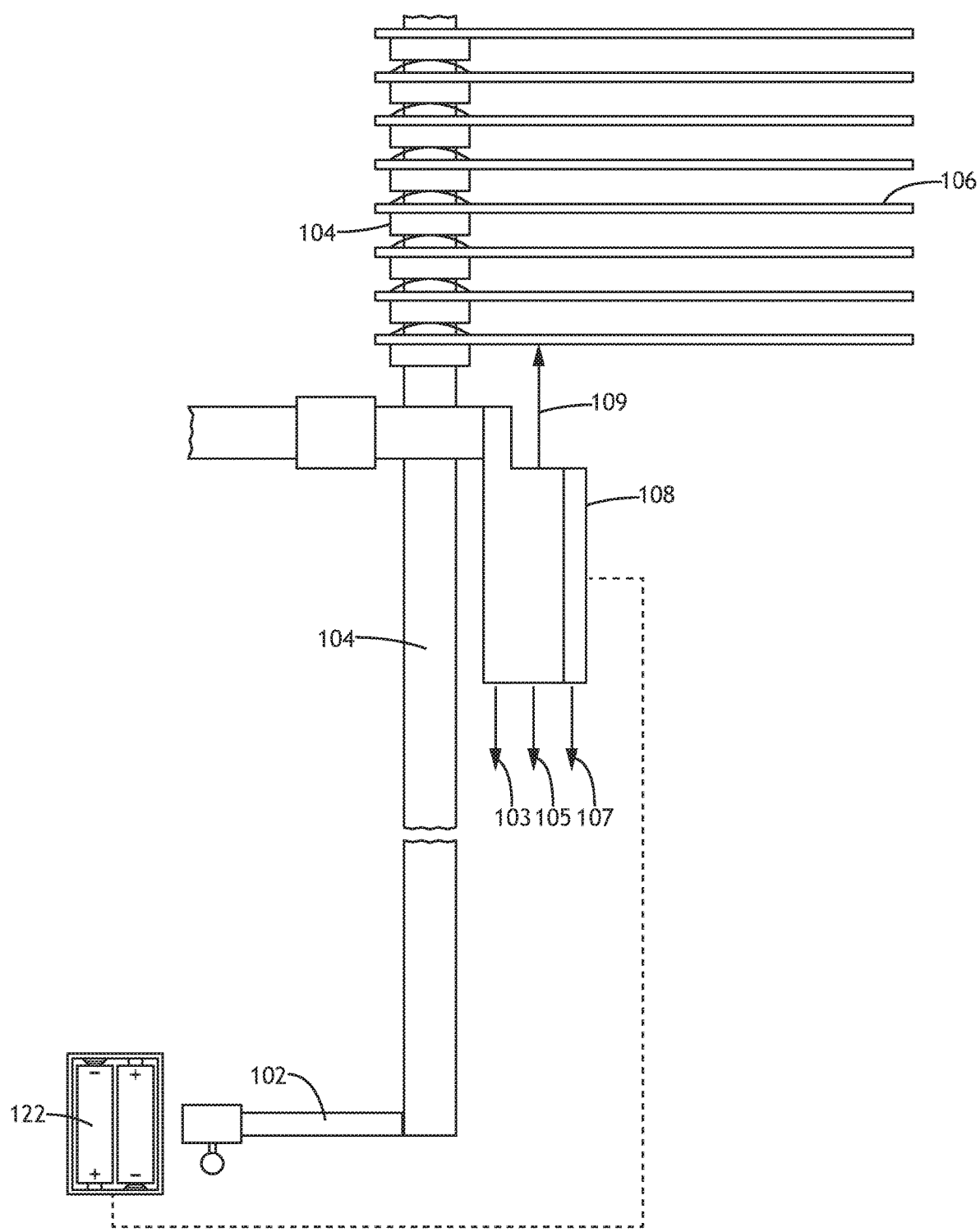
FIG. 3B illustrates a measurement device of the vertical jump measurement system, in accordance with one or more embodiments of the present disclosure.
Figure 3C:
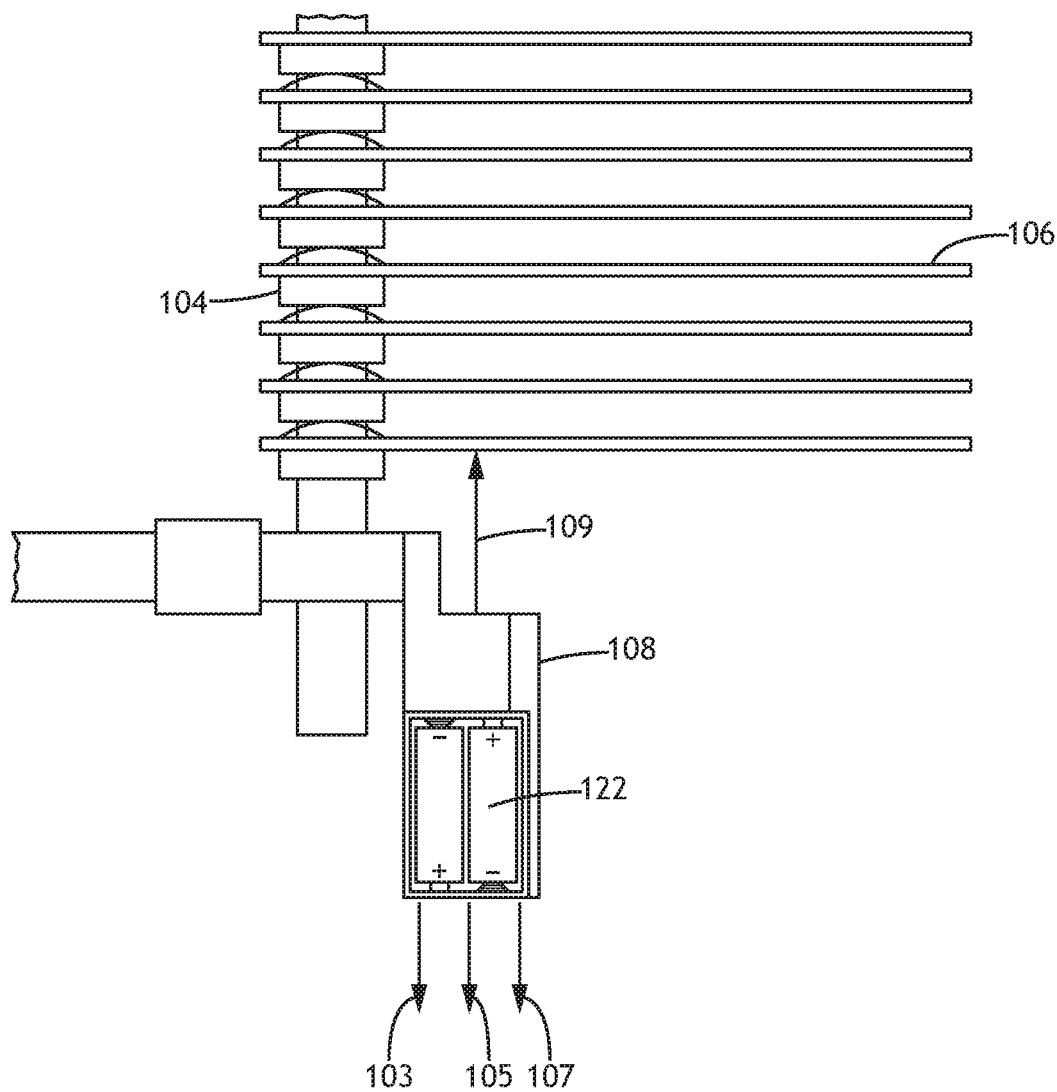
FIG. 3C illustrates a measurement device of the vertical jump measurement system, in accordance with one or more embodiments of the present disclosure.

FIGS. 3A-3C illustrate a measurement device 108 of the vertical jump measurement system 100, in accordance with one or more embodiments of the present disclosure.

In one embodiment, as shown in FIGS. 3A-3B, the one or more power sources 122 may be located on ground level and configured to couple to the measurement device 108. For example, the power source 122 may include a port 123 for coupling the measurement device 108 to an external power source via a wireline connection. As shown in FIG. 3A, the measurement device 108 may include a universal serial bus (USB) port 123 for coupling the measurement device 108 to an external USB power source via a USB wireline connection. In this regard, the USB power source may include a USB battery pack, wall converter, computer (e.g., laptop or desktop), or the like configured to provide power to the measurement device 108.

In another embodiment, as shown in FIG. 3B, the measurement device 108 be configured to couple the measurement device 108 to an external power source such as, but not limited to, a battery pack 122.

In another embodiment, as shown in FIG. 3C, the one or more power sources 122 are housed within the measurement device 108. In this embodiment, the power source 122 of measurement device 108 may include, but is not limited to, one or more batteries, one or more battery packs, or the like.

In one embodiment, as shown in FIGS. 3A-3C, the measurement device 108 may be coupled to the base structure 102 and/or the extendable member 104 proximate to a first vane 106 of the plurality of vanes 106. In another embodiment, the measurement device 108 may include one or more sensors 124 configured to collect measurements upward from the measurement device 108, and/or one or more sensors 124 configured to collect measurements downward from the measurement device 108. For example, the measurement device 108 may include one or more ultrasonic sensors (e.g., sensors 124) configured to obtain a baseline height 103, a user height 105, and a user reach 107. The measurement device 108 may also include one or more ultrasonic sensors (e.g., sensors 124) configured to obtain a displacement height 109.

Figure 4:
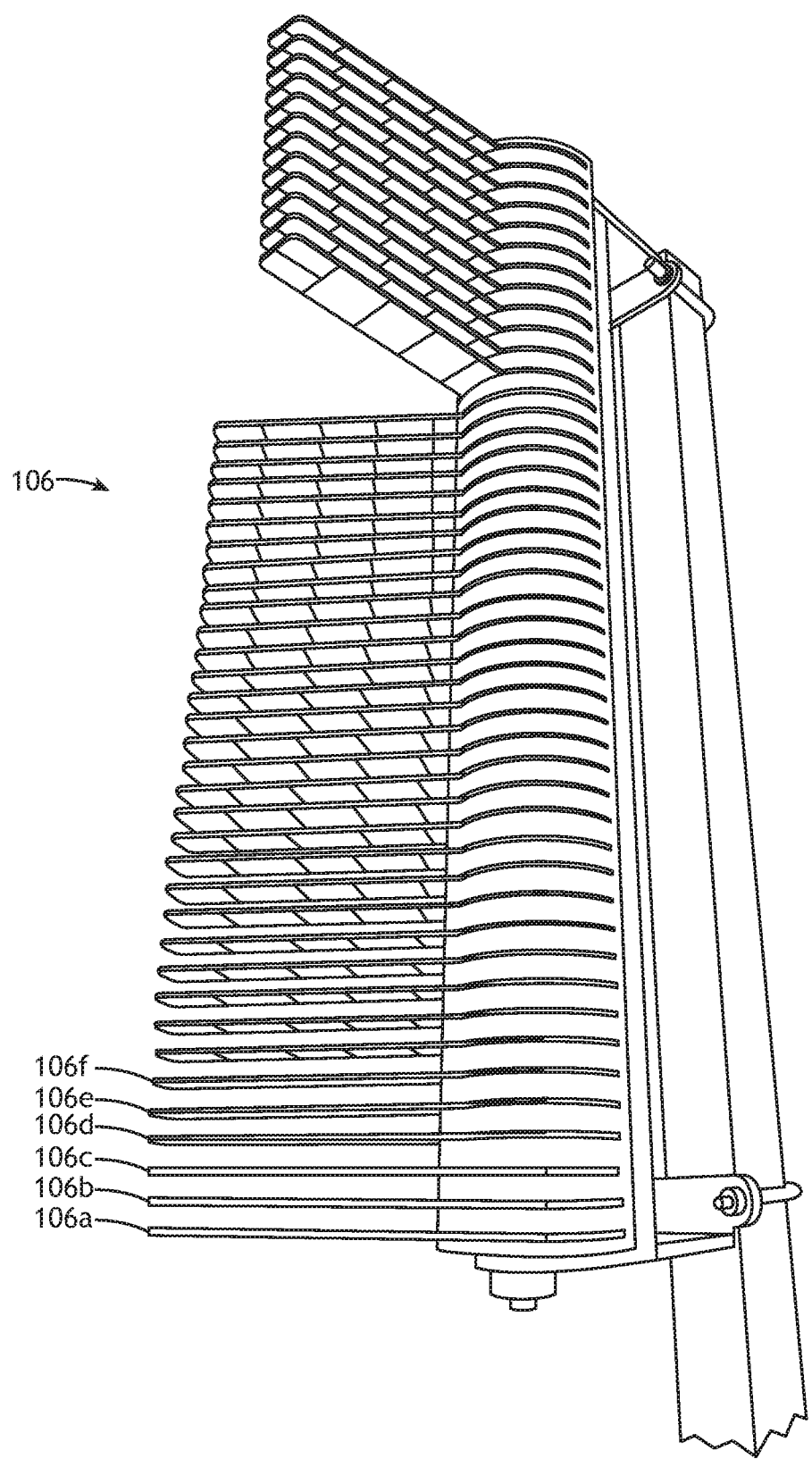
FIG. 4 illustrates vanes of the vertical jump measurement system, in accordance with one or more embodiments of the present disclosure.

FIG. 4 illustrates vanes 106 of the vertical jump measurement system, in accordance with one or more embodiments of the present disclosure.

In one embodiment, the measurement device 108 may be configured to scan, read, or otherwise detect figures, markings, or devices disposed on the vanes 106. For example, as shown in FIG. 4, a vane 106 may include markings on the bottom surface of the vane 106 such that the measurement device 108 may read, scan, or otherwise detect the markings. Markings located on vanes 106 may include any markings known in the art including, but not limited to, words, numbers, characters, bar codes, QR codes, scan codes, and the like. Furthermore, markings located on the vanes 106 may indicate the height of the respective vanes 106. In this regard, markings located on vanes 106 be used to facilitate measurement of vanes 106 which are in an original position or a displaced position. In this regard, the measurement device 108 may include any measurement device known in the art configured to read and/or scan markings or devices disposed on the vanes 106.

For example, each vane 106 of the plurality of vanes 106 may include numerical numbers which indicate relative heights with respect to a first vane 106a of the plurality of vanes 106. For instance, a second vane 106b may include a numerical "1" indicating that the second vane 106b is one inch higher than the first vane 106a. In this example, a user 101 may jump and contact the first five vanes 106a, 106b, 106c, 106d, 106e, thereby displacing vanes 106a-106e from an original position to a displaced position. The one or more sensors 124 of the measurement devices 108 may include one or more cameras configured to read the markings located on the underside of the vanes 106. In this example, the one or more cameras may be configured to read the numerical marking on the sixth vane 106f remaining in the original position, thereby indicating that vanes 106a-106e have been displaced. By way of another example, the measurement device 108 may be configured to read and/or scan distance measurements indicated on the extendable member 104. For instance, the extendable member 104 may include distance markings indicating the relative heights of the respective vanes 106, and the measurement devices 108 may be configured to read distance markings on the extendable member 104 to obtain the uppermost vane 106 in a displaced position.

It is noted herein that the measurement device 108 may include any sensor, scanner, or imaging device known in the art for scanning and/or reading markings or devices on vanes 106. For example, in embodiments where one or more cameras image markings on vanes 106, the one or more processors 126, 112 may be configured to execute optical character recognition (OCR) software in order to decipher the markings.

By way of another example, the measurement device 108 may be configured to obtain a reading (e.g., image, scan, and the like) of one or more markings on the vanes 106. The measurement devices 108 may then be further configured to transmit the one or more readings of the one or more markings to the controller 110. The controller 110 may then be configured to determine the displacement height 109 based on the one or more readings of the markings obtained by the measurement devices 108.

Figure 5:
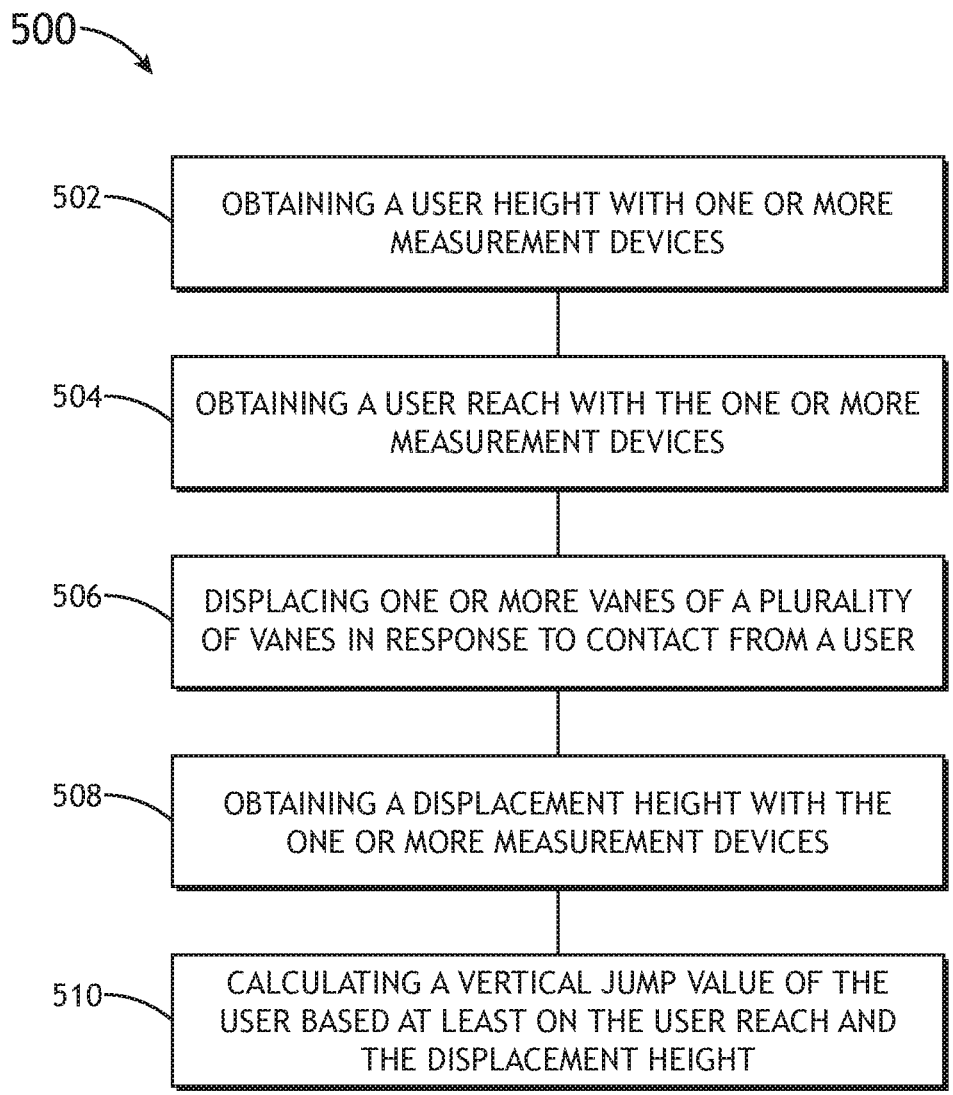
FIG. 5 illustrates a flowchart of a method for measuring vertical jump, in accordance with one or more embodiments of the present disclosure.

FIG. 5 illustrates a flowchart of a method 500 for measuring a vertical jump, in accordance with one or more embodiments of the present disclosure. It is noted herein that the steps of method 500 may be implemented all or in part by system 100. It is further recognized, however, that the method 500 is not limited to the system 100 in that additional or alternative system-level embodiments may carry out all or part of the steps of method 500.

In a step 502, a user height is obtained with one or measurement devices. For example, a user 101 may stand proximate and/or underneath the measurement device 108 such that the measurement device 108 may obtain a user height 105 measurement. For instance, in embodiments where the measurement device 108 includes one or more laser-based measurement devices, a user may place a flat object (e.g., a clipboard or the like) on top of the user's head and a laser of the one or more laser-based measurement devices may hit a surface of the flat object (e.g., a clip board or the like) and obtain the user height 105. As noted previously herein, the measurement device 108 may include, but are not limited to, one or more laser distance finders, one or more ultrasonic measurement devices, one or more cameras, one or more time of flight sensors, one or more beam break sensors, and the like. The user height 105 may be defined as the distance from a ground level to the top of a user's 101 head.

Prior to step 502, a ground height may be obtained with the measurement device 108. For example, a flat object (e.g., a clipboard or the like) may be placed on the ground proximate and/or underneath the measurement device 108 such that the ground height may be obtained. For instance, in embodiments where the measurement device includes one or more laser-based measurement devices, a laser of the one or more laser-based measurement devise may hit a surface of the flat object (e.g., a clip board or the like) and obtain the ground height. It is noted herein that ground height is defined as the distance between the ground and the measurement device 108.

In a step 504, a user reach is obtained with the measurement device. For example, a device (e.g., a glove, a thimble, a finger clamp, and the like) may be disposed on a finger of the user 101 in order to facilitate measurement of the user reach 107. For instance, in embodiments where the measurement device 108 includes one or more laser-based measurement devices, a thimble disposed on the middle finger of a user 101 may facilitate accurate measurement of the user reach 107. By way of another example, a flat object (e.g., clip board, and the like) may be placed upon the head of a user 101 in order to facilitate accurate calculation of the user reach 107. As noted previously herein, a user reach 107 may be defined as the distance between a ground level and the top of a user's 101 fingertips as the user stands flat-footed and reaches at least one arm upward.

It is noted herein that steps 502 and/or 504 may optionally be performed when the system 100 needs to be calibrated. For example, steps 502 and/or 504 may not need to be performed if a user height and/or user reach is stored in the memory 114, 128. By way of another example, steps 502 and/or 504 may not need to be performed if a user height and/or user reach is entered into the system 100 via the user device 116.

In a step 506, one or more vanes of a plurality of vanes are displaced in response to contact from a user. For example, a user 101 may stand proximate and/or underneath a plurality of vanes 106, jump upwards, and make contact with at least a subset of the plurality of vanes, thereby displacing the subset of vanes from an original position (e.g., a "start" position) to a displaced position (e.g., a "end" position).

Prior to step 506, the one or more vanes of the plurality of vanes 106 may be aligned by a user 101. Alignment of the one or more vanes 106 ensures that an accurate displacement height is calculated in step 508.

In a step 508, a displacement height is obtained with the measurement device. For example, as noted previously herein, the displacement height 109 may be defined as the distance from an uppermost vane in a displaced position to a ground level.

In a step 510, a vertical jump value of the user is calculated based at least on the user reach and the displacement height. For example, the one or more processors 112 may be configured to calculate a "relative" vertical jump value and an "absolute" vertical jump value based on values received from the measurement device. As previously noted herein, a "relative" vertical jump value may be defined as the difference between a user reach 107 of a user 101 and the height of an uppermost displaced vane 106. This may be referred to as a "relative" vertical jump height, as it takes into account an original user reach 107. Conversely, an "absolute" vertical jump value may be defined as the distance between ground level and an uppermost displaced vane 106. This may be referred to as an "absolute" vertical jump value as it does not take into account a user reach 107, and instead indicates a highest point relative to ground a user 101 may reach.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, comprising:
a vane assembly comprising a plurality of vanes movably coupled to an extendable member at a plurality of heights relative to a ground level, wherein each vane is displaceable from an original position to a displaced position in response to contact from a user;
a measurement device communicatively coupled to the vane assembly, the measurement device positioned proximate to the vane assembly, the measurement device including one or more laser-based measurement devices, the one or more laser-based measurement devices including one or more sensors configured to collect one or more measurements upward from the measurement device, a processor in communication with the one or more sensors wherein the processor is configured to collect one or more measurements downward from the measurement device, the measurement device configured through the processor to obtain at least one of:
  a baseline height from a first vane of the plurality of vanes to the ground level via the one or more sensors configured to collect one or more measurements downward from the measurement device;
  a user height via the one or more sensors configured to collect one or more measurements downward from the measurement device;
  a user reach via the one or more sensors configured to collect one or more measurements downward from the measurement device; or
  a displacement height, wherein the displacement height is the height of the uppermost vane in a displaced position relative to the ground level via the one or more sensors configured to collect one or more measurements upward from the measurement device; and
a controller communicatively coupled to the measurement device, the controller configured to:
  receive at least one of the user height, the user reach, the baseline height, or the displacement height from the measurement device; and
  calculate a vertical jump value of the user based at least on the displacement height.

2. The system of claim 1, further comprising a user device configured to display the vertical jump value.

3. The system of claim 1, wherein the measurement device is configured to obtain at least one of the baseline height, user height, user reach, and displacement height in response to one or more input commands received from a user device.

4. The system of claim 1, further comprising a base structure, wherein the extendable member is slidingly coupled to the base structure.

5. The system of claim 4, wherein the base structure includes a motor, wherein the controller is configured to generate one or more signals configured to cause the motor to actuate the extendable member in response to one or more input commands received from a user device.

6. The system of claim 1, wherein the one or more laser-based measurement devices comprise one or more bi-directional laser-based measurement devices.

7. The system of claim 1, wherein the controller is configured to determine the displacement height based on one or more readings of one or more markings on one or more vanes of the plurality of vanes obtained with the measurement device.

8. The system of claim 1, wherein the controller is further configured to store the vertical jump value in memory.

9. The system of claim 1, wherein the controller comprises a local controller.

10. The system of claim 1, wherein the controller comprises a remote controller communicatively coupled to the measurement device via a network.

11. The system of claim 1, wherein the controller is further configured to:
  calculate an absolute vertical jump value of the user based on the baseline height and the displacement height.

12. A system, comprising:
a measurement device communicatively couplable to a vane assembly, the measurement device positioned proximate to the vane assembly, the vane assembly comprising a plurality of vanes movably coupled to an extendable member at a plurality of heights relative to a ground level, wherein each vane is displaceable from an original position to a displaced position in response to contact from a user, wherein the measurement device includes one or more laser-based measurement devices including one or more sensors and a processor in communication with the one or more sensors, the processor configured to direct the one or more sensors to collect one or more measurements upward from the measurement device, the processor configured to direct the one or more sensors to collect one or more measurements downward from the measurement device, wherein the measurement device is configured through the processor to obtain at least one of:
  a baseline height from a first vane of the plurality of vanes to the ground level via the one or more sensors configured to collect one or more measurements downward from the measurement device;
  a user height via the one or more sensors configured to collect one or more measurements downward from the measurement device;
  a user reach via the one or more sensors configured to collect one or more measurements downward from the measurement device; or
  a displacement height, wherein the displacement height is the height of the uppermost vane in a displaced position relative to ground level via the one or more sensors configured to collect one or more measurements upward from the measurement device; and
a controller communicatively coupled to the measurement device, the controller configured to:
  receive at least one of the user height, the user reach, the baseline height, or the displacement height from the measurement device; and
  calculate a vertical jump value of the user based at least on the displacement height.

13. The system of claim 12, further comprising a base structure, wherein the extendable member is slidingly coupled to the base structure.

14. The system of claim 13, wherein the base structure includes a motor, wherein the controller is configured to generate one or more signals configured to cause the motor to actuate the extendable member in response to one or more input commands received from a user device.

15. The system of claim 12, wherein the one or more laser-based measurement devices comprise one or more bi-directional laser-based measurement devices.

16. The system of claim 12, wherein the controller is configured to determine the displacement height based on one or more readings of one or more markings on one or more vanes of the plurality of vanes obtained with the measurement device.

17. The system of claim 12, wherein the controller is further configured to:
  calculate an absolute vertical jump value of the user based on the baseline height and the displacement height.

18. A method, comprising:
providing the device of claim 1;
obtaining a baseline height with one or more sensors configured to collect one or more measurements upward from a measurement device, the baseline height from a first vane of a plurality of vanes to a ground level;
obtaining a user height with the one or more sensors configured to collect one or more measurements downward from the measurement device;
obtaining a user reach with the one or more sensors configured to collect one or more measurements downward from the measurement device;

displacing one or more vanes of a plurality of vanes in response to contact from a user;

obtaining a displacement height with one or more sensors configured to collect one or more measurements upward from the measurement device, the displacement height being the height of the uppermost vane of the plurality of vanes in a displaced position relative to the ground level; and calculating a vertical jump value of the user based at least on the displacement height.

19. The method of claim 18, wherein the calculating a vertical jump value of the user based at least on the displacement height comprises:

calculating an absolute vertical jump value of the user based on the baseline height and the displacement height.

* * * * *